April 10, 1928. L. S. STRIPLING 1,665,645
WINDMILL
Filed Aug. 31, 1927   3 Sheets-Sheet 2
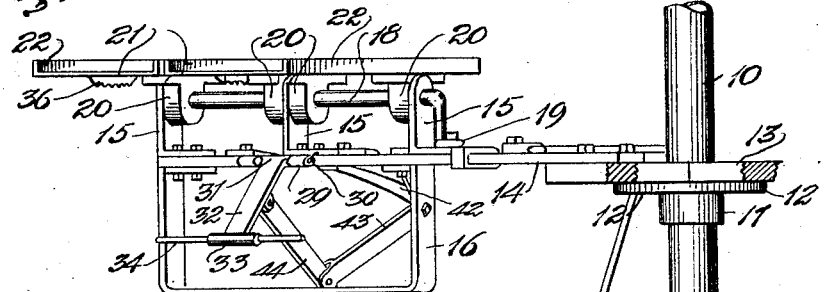

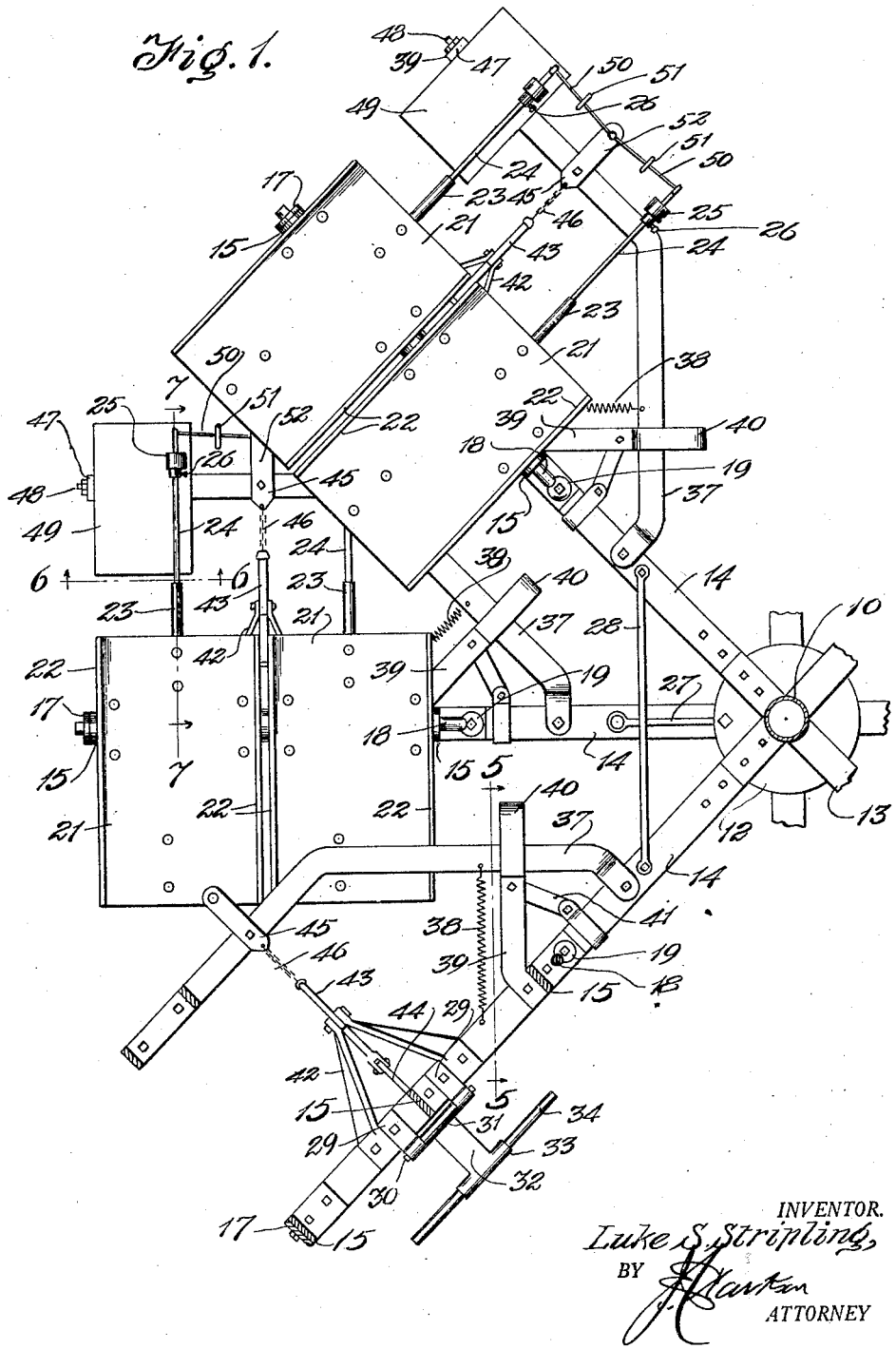

April 10, 1928.
L. S. STRIPLING
WINDMILL
Filed Aug. 31, 1927
1,665,645
3 Sheets-Sheet 3
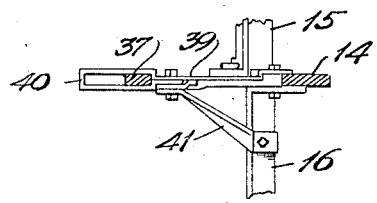
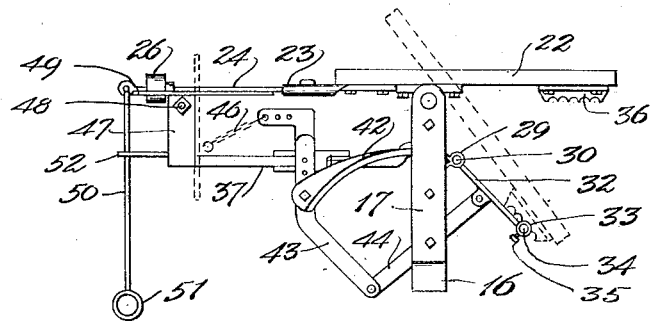
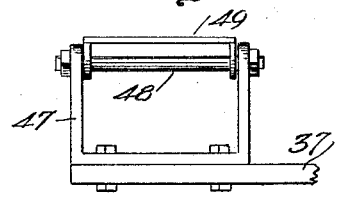
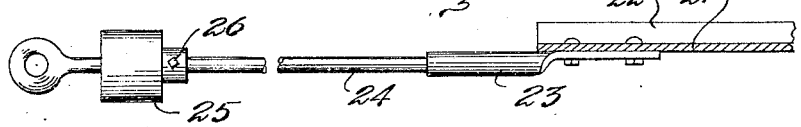
INVENTOR.
Luke S. Stripling,
BY
ATTORNEY Patented Apr. 10, 1928.

1,665,645

UNITED STATES PATENT OFFICE.

LUKE S. STRIPLING, OF AMARILLO, TEXAS.

WINDMILL.

Application filed August 31, 1927. Serial No. 216,644.

This invention relates to windmills and has special reference to a windmill wherein the windwheels revolve on a vertical axis and are provided with feathering vanes.

In my prior application for patent Serial No. 192,947, filed the 20th day of May, 1927, I have shown and described a windmill of this general type wherein novel means are used to limit the opening of a pair of cooperating vanes. I have also previously shown and described a suitable tower construction for such a windmill.

One important object of the invention is to provide a windmill of the class described having a novel and improved means for limiting the movement of the vanes in accordance with the intensity or velocity of the wind blowing at the time.

A second important object of the invention is to provide improved means for so controlling the vanes and in which the control will be entirely automatic so that no matter whether the wind is blowing steadily or in gusts the vanes in their driving positions will always be at such an angle to the direction of the wind during their movement of the propulsive arc, as to suit the intensity or velocity of such wind as it may vary from time to time.

A third important object of the invention is to provide an improved form of windwheel and controlling device wherein a single controlling device may be used for several independent vanes.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of a portion of two windwheels constructed in accordance with this invention, one of the wheels being located above the other and the view showing the upper wheel partly in section.

Figure 2 is an elevation showing parts of two such wheels.

Figure 3 is a detail section on the line 3—3 of Figure 2.

Figure 4 is a view looking endwise at one arm of the improved windwheel, the view showing the vanes in feathering position in full lines and in wind receiving or open position in dotted lines.

Figure 5 is an enlarged detail section on the line 5—5 of Figure 1.

Figure 6 is an enlarged detail section on the line 6—6 of Figure 1.

Figure 7 is a detail section on the line 7—7 of Figure 1.

In the present construction of the invention there is provided a main shaft or vertical shaft 10 which is supported in any suitable form of bearings for free revolution and from which the drive, which as before noted is not shown, is taken. The bearings for the shaft are of course supported in a suitable form of tower which is also not shown. At intervals in the height of this shaft there are keyed collars 11 carrying disks 12 so that the revolution of these disks effects revolution of the shaft 10. Each of these disks supports a spider 13 preferably having, as shown, four arms although this spider may have as many arms as may be found desirable. However, it is to be noted that the arms for one spider arranged, in plan, in staggered relation to the arms of the spider next below. That is to say, if each spider has four arms the arms for one spider will be displaced about the axis of the shaft 10 to the extent of forty-five degrees with relation to the arms of the other spider next below. Each arm of each spider supports a main wheel arm 14 which is securely bolted to the spider arm. On top of the outer end of each arm 14 is a series of equally spaced L-shaped brackets 15 which are securely bolted to the arm 14. In like manner below each arm 14 is a stop bracket 16 which is secured at its ends to the arm 14 by the bolts which secure the inner most and outermost brackets 15 as can clearly be seen by reference to Figure 2. Moreover, the outermost bracket 15 and the bracket 16 are braced together by a reinforcing strip 17 bolted securely to both brackets. Through the brackets 15 extends a shaft 18 and the inner end of this shaft is turned downwardly and provided with a eye 19 which rests on the foot of the innermost bracket 15, one of the securing bolts of the bracket passing through this eye to hold the shaft 18 properly in position. On the shaft 18 between each pair of the brackets 15 is a pair of bearing blocks 20 and these bearing blocks are securely bolted to the outsides of vanes 21, it being noted that these vanes have upturned reinforcing edge 22 to stiffen them and that they are so positioned on the bearing blocks that considerably more of the vane lies in front of such bearing blocks than lies to the rear thereof. Thus the tendency of these vanes is to hang vertically with the longer end downward but this tendency is in a measure overcome by certain counter-balancing means. The counter-balancing means for each vane consists of a substantially tubular member 23 having a flattened end secured beneath the rear or upper end of the respective vane and projecting from this tubular member is a spring rod 24 carrying a sliding counter-weight 25 which is secured in adjusted position on the rod by means of a set screw 26. These counter-weights are so adjusted that they will almost, but not quite, overcome the tendency of the vanes to hang perpendicularly with their longer ends downward. It will be observed that in the present case a single pair of vanes has been shown on each arm. It will also be observed that each of the lower arms is intended to be braced to the spiders above by a suitable bracing 27 and that the spider arms may be braced together as desired, such bracing being indicated in general at 28.

On each side of the central bracket 15 there is secured to the arm 14 a pair of bearings 29 which are in spaced relation and these bearings carry a pivot rod 30 so that between the bearings there may be mounted a sleeve 31 from which extends a swinging arm 32 carrying on its free end a sleeve 33 wherein a transverse rod 34 is secured by a set screw 35. The ends of this transverse rod extend beneath the forward ends of the vanes 21 and bolted to these vanes adjacent the forward ends are toothed plates 36 which are so positioned that when the vanes are moved to open position the rod 34 will engage between certain of the teeth of the plates 36, the engagement bearing with the position of the arm 32 so that the extent of opening of the vane 21 is thereby regulated.

Pivoted to each arm 14 in spaced relation to its inner end is an auxiliary arm 37, the arrangement being such that the arm swings in a horizontal plane so that the free end of the arm 37 can move toward and from the outer end of the arm 14. Preferably the outer portion of each arm 37 is normally parallel or nearly so to the respective arm 14 and springs 38 tend to hold the arms 37 in their normal position. Moreover, each arm 14 carries a bracket 39 which is provided with a loop 40 surrounding the arm 37 and thus limiting the movement thereof, the bracket being braced to the arm 14 and bracket 16 by bracing 41. At each side of the central bracket 15 there is provided a rearwardly extending bracket 42 and between these rearwardly extending brackets is pivoted the central part of a bent lever 43 having its lower end connected to the swinging arm 32 by a link 44 so that as the lever 43 moves on its pivot the link 44 is raised and lowered in accordance with the direction of such movement. On each of the auxiliary arms 37 is a bracket 45 which is connected to the upper end of the lever 43 by means of a chain 46. By this construction movement of the arm 37 will effect movement of the swinging arm 32 and thus control the extent of opening of the vanes 21. On the free end of each arm 37 is securely bolted a U-shaped bracket 47 in which is mounted a shaft 48 held in position by suitable nuts. On each shaft 48 is pivotally mounted an auxiliary vane 49 which, like the vanes 21, projects forwardly to a greater extent than it projects rearwardly so that its normal tendency is to assume a vertical position with the longer end downward. These vanes 49 are comparatively small and exercise little propulsive effect on the wheel, the object of these vanes being to swing the arm 37 further away from the arm 14 as the wind velocity increases so that the higher the winds the cross-bar 34 will be raised to a higher position and the vanes 21 will be limited in their opening. In fact, in very high winds such as would tend to destroy the windwheel the arrangement is such that the vanes 21 remain with their edges toward the wind at all times. In order to further control the position of the vanes 21 each rod 24 has connected thereto a flexible rope 50 which carries a ring 51, the other end of the rope being fixed to a bracket 52 mounted on the respective arm 37. By pulling on the ring 51 the bight portion of the rope will be drawn downward, slipping through the ring, and the lever or rod 24 will be in like manner pulled down so that the main vane will be moved toward a horizontal position in each case.

Thus in operation on one side of the shaft 10 the vanes 21 will lie in a horizontal or feathered position while on the opposite side of said shaft these vanes will assume an open or inclined position in which the extent of inclination is regulated by the pressure exerted on the vanes 49 by the wind and as each vane 49 thus controls one set of the vanes 21 any variation of the wind is at once accommodated by the variation in position of the respective arm 37 with reference to its supporting arm 15, such variation in position immediately causing corresponding variation in position of the transverse stop rod 34.

Furthermore, it will be noted that when the counter-balance rod 24 is pulled down across the auxiliary vane it holds that vane flat from tilting so that neither the minor nor the major vanes act to rotate the windmill. Also the minor vane is struck by the wind for effective operation ahead of the major vanes and thus the stop mechanism for the major vanes, under the influence of high winds, is set before these vanes are struck by the high winds.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a windmill, a vertical shaft, arms projecting radially therefrom, each arm having a main vane mounted thereon to swing on an axis carried by said arm, a secondary arm having one end pivoted to each first arm to swing in a horizontal plane, a vane carried by each secondary arm, a stop device pivoted to each first arm to limit the movement of the vane carried by said first arm, and operative connections between the secondary arms and the said stop devices.

2. In a windmill, a vertical shaft, arms projecting radially therefrom, each arm having a main vane mounted thereon to swing on an axis carried by said arm, a secondary arm having one end pivoted to each first arm to swing in a horizontal plane, a vane carried by each secondary arm, a stop device pivoted to each first arm to limit the movement of the vane carried by said first arm, operative connections between the secondary arms and the said stop devices, and springs urging said secondary arms toward the first arms.

3. In a windmill, a vertical shaft, main arms radiating from said shaft, vanes each mounted on a respective main arm to oscillate on a horizontal axis between positions edgewise to the wind and flatwise to the wind, swinging stops each pivotally mounted on a main arm beneath the vane carried by said arm and variably limiting the movement of the vane to flatwise position, secondary arms each having an end pivoted to a main arm to swing toward and from the main arm in a horizontal plane, secondary vanes each carried by a respective secondary arm, and an operative connection between each secondary arm and the swinging stop of the corresponding main arm.

4. In a windmill, a vertical shaft, main arms radiating from said shaft, vanes each mounted on a respective main arm to oscillate on a horizontal axis between positions edgewise to the wind and flatwise to the wind, swinging stops each pivotally mounted on a main arm beneath the vane carried by said arm and variably limiting the movement of the vane to flatwise position, secondary arms each having an end pivoted to a main arm to swing toward and from the main arm in a horizontal plane, secondary vanes each carried by a respective secondary arm, an operative connection between each secondary arm and the swinging stop of the corresponding main arm, and springs urging the free ends of the secondary arms toward the main arms.

5. In a windmill, a vertical shaft, main arms radiating from said shaft, vanes each mounted on a respective main arm to oscillate on a horizontal axis between positions edgewise to the wind and flatwise to the wind, swinging stops each pivotally mounted on a main arm beneath the vane carried by said arm and variably limiting the movement of the vane to flatwise position, secondary arms each having an end pivoted to a main arm to swing toward and from the main arm in a horizontal plane, secondary vanes each carried by the free end of a respective secondary arm to oscillate on a horizontal axis, and a flexible operative connection between each secondary arm and the swinging stop on the main arm to which the secondary arm is pivoted.

6. In a windmill, a vertical shaft, main arms radiating from said shaft, vanes each mounted on a respective main arm to oscillate on a horizontal axis between positions edgewise to the wind and flatwise to the wind, swinging stops each pivotally mounted on a main arm beneath the vane carried by said arm and variably limiting the movement of the vane to flatwise position, secondary arms each having an end pivoted to a main arm to swing toward and from the main arm in a horizontal plane, secondary vanes each carried by the free end of a respective secondary arm to oscillate on a horizontal axis, a lever pivoted intermediate its ends on each main arm, a link connecting one end of each lever to the respective swinging stop, and a flexible connection between the remaining end of each lever and the corresponding secondary arm.

7. In a windmill, a horizontal main arm revoluble about a vertical axis, a horizontal shaft supported on the main arm above the outer end thereof, a pair of vanes mounted on said shaft for oscillation thereon, a swinging arm having one end pivotally connected to the main arm below the space between said vanes, a cross-bar carried by the free end of said arm, toothed bars mounted beneath the end portions of the vanes remote from said shaft, said cross-bar being arranged for selective engagement between teeth of the toothed bars to limit oscillation of the vanes in one direction, and means to vary the position of the swinging arm in accordance with the force of the wind.

8. In a windmill, a horizontal main arm revoluble about a vertical axis, a horizontal shaft supported on the main arm above the outer end thereof, a pair of vanes mounted on said shaft for oscillation thereon, a swinging arm having one end pivotally connected to the main arm below the space between said vanes, a cross-bar carried by the free end of said arm, toothed bars mounted beneath the end portions of the vanes remote from said shaft, said cross-bar being arranged for selective engagement between teeth of the toothed bars to limit oscillation of the vanes in one direction, a secondary arm having one end pivoted to the main arm to swing in a horizontal plane, said secondary arm having its free end positioned behind the outer end of the main arm, a secondary vane carried by the secondary arm at its free end, and an operative connection between the secondary and swinging arms to actuate the latter in accordance with the movement of the secondary arm with reference to the main arm under the influence of wind.

9. In a windmill, a horizontal main arm revoluble about a vertical axis, a horizontal shaft supported on the main arm above the outer end thereof, a pair of vanes mounted on said shaft for oscillation thereon, a swinging arm having one end pivotally connected to the main arm below the space between said vanes, a cross-bar carried by the free end of said arm, toothed bars mounted beneath the end portions of the vanes remote from said shaft, said cross-bar being arranged for selective engagement between teeth of the toothed bars to limit oscillation of the vanes in one direction, a secondary arm having one end pivoted to the main arm to swing in a horizontal plane, said secondary arm having its free end positioned behind the outer end of the main arm, a secondary vane carried by the secondary arm at its free end, an operative connection between the secondary and swinging arms to actuate the latter in accordance with the movement of the secondary arm with reference to the main arm under the influence of wind, and spring means restraining the movement of the secondary arm relative to said main arm under wind influence.

10. In a windmill, a horizontal main arm revoluble about a vertical axis, a horizontal shaft supported on the main arm above the outer end thereof, a pair of vanes mounted on said shaft for oscillation thereon, a swinging arm having one end pivotally connected to the main arm below the space between said vanes, a cross-bar carried by the free end of said arm, toothed bars mounted beneath the end portions of the vanes remote from said shaft, said cross-bar being arranged for selective engagement between teeth of the toothed bars to limit oscillation of the vanes in one direction, a secondary arm having one end pivoted to the main arm to swing in a horizontal plane, said secondary arm having its free end positioned behind the outer end of the main arm, a secondary vane carried by the secondary arm at its free end, a bracket projecting rearwardly from the main arm behind said swinging arm, a lever pivoted intermediate its ends to the rear end of said bracket, a link connecting one end of the lever with said swinging arm, a flexible connection between the remaining end of the lever and the secondary arm, and spring means restraining the movement of the secondary arm relative to said main arm under wind influence.

In testimony whereof I affix my signature.

LUKE S. STRIPLING.